United States Patent
Chung et al.

(10) Patent No.: US 11,639,135 B2
(45) Date of Patent: May 2, 2023

(54) VEHICLE ROCK SLIDER WITH REMOVABLE COVER

(71) Applicant: Toyota Motor Engineering & Manufacturing North America, Inc., Plano, TX (US)

(72) Inventors: James Chung, Ypsilanti, MI (US); Ryan C. Harris, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 133 days.

(21) Appl. No.: 17/214,671

(22) Filed: Mar. 26, 2021

(65) Prior Publication Data
US 2022/0306002 A1    Sep. 29, 2022

(51) Int. Cl.
*B60R 3/00* (2006.01)
*B60R 13/04* (2006.01)
(52) U.S. Cl.
CPC .............. *B60R 3/002* (2013.01); *B60R 13/04* (2013.01); *B60R 2013/046* (2013.01)
(58) Field of Classification Search
CPC .... B60R 3/002; B60R 13/04; B60R 2013/046
See application file for complete search history.

(56) References Cited

U.S. PATENT DOCUMENTS

| | | | |
|---|---|---|---|
| 1,178,723 A * | 4/1916 | Hudson | B60R 3/002 |
| | | | 280/169 |
| 4,346,930 A | 8/1982 | Northey | |
| 6,581,946 B2 | 6/2003 | Lund et al. | |
| 6,688,821 B1 | 2/2004 | Benirschke | |
| 8,231,169 B2 | 7/2012 | Leoplod | |
| 9,616,940 B2 | 4/2017 | Ito et al. | |
| 9,623,823 B2 * | 4/2017 | Vermeys | B60R 3/002 |
| 2012/0169024 A1 | 7/2012 | Verhee et al. | |
| 2020/0339204 A1 * | 10/2020 | Crandall | B62D 23/005 |

FOREIGN PATENT DOCUMENTS

DE    19747171 A1    4/1999
KR    19980049531 A    9/1998

OTHER PUBLICATIONS

Rocker Rail, Pair, TJ Unlimited/LJ and CJ-8 (https://metalcloak.com/rocker-rail-pair-tj-unlimited-lj-and-cj-8.html).
The Guide to Choosing Rock Sliders and Rocker Guards—Weldon or Bolt-on Sliders? (https://www.roundforge.com/articles/rock-sliders-and-rockerguards/# Weld-on_Rock_Sliders_).

* cited by examiner

*Primary Examiner* — Bryan A Evans
(74) *Attorney, Agent, or Firm* — Snell & Wilmer LLP

(57) ABSTRACT

A vehicle rock slider having a removable cover and methods of using the same. The rock slider may be attachable to a rocker panel of the vehicle along a length of the rocker panel such that an edge of the rock slider extends below a rocker flange extending downward from a bottom of the rocker panel. The rock slider may have a cover removably attachable onto the rock slider. The cover may be shaped and sized to conceal the rock slider when the rock slider is not in use.

19 Claims, 4 Drawing Sheets

VEHICLE ROCK SLIDER WITH REMOVABLE COVER

I. Field

The present disclosure is directed to vehicle rock sliders, particularly rock sliders having removable covers, and methods of using the same.

2. Description of the Related Art

Rock sliders are commonly used among vehicle owners who use their vehicles (e.g., SUVs, UTVs, pick-up trucks, etc.) off-road and/or on rough terrain. Generally, rock sliders are installed over the rocker panels on the sides of a vehicle. Rock sliders protect vehicles, particularly rocker panels and bottoms of vehicles, from damage arising from rocks and other types of debris found on the driving surface. Rocker panels and vehicle bottoms are close to the ground and thus highly likely to be damaged off-road. Hence, rock slider protection can be critical to vehicle protection.

Currently available rock sliders, however, are generally bulky, heavy, visually unappealing, and difficult to install. Some rock sliders may have to be custom made to fit a particular vehicle. Installation of rock sliders may require drilling holes in the frame and/or the body or welding.

Hence, there is a need for an integrated vehicle rock slider with a removable cover.

SUMMARY

A vehicle rock slider having a removable cover and methods of using the same are disclosed herein. The rock slider may be integrated into the rocker panel of the vehicle. The rock slider may be within a styling envelop of the vehicle. The rock slider may be attachable to a rocker panel of the vehicle along a length of the rocker panel such that an edge of the rock slider extends below a rocker flange extending downward from a bottom of the rocker panel. The rock slider may have a cover removably attachable onto the rock slider. The cover may be shaped and sized to conceal the rock slider when the rock slider is not in use. The cover may be removed when off-roading or driving on a surface having low ground clearance to use the rock sliders and prevent damage to the body panels.

In accordance with an embodiment of the present disclosure, there may be a vehicle having an having an improved crash performance and body panel damage protection. The vehicle may include a rocker panel. The rocker panel may have a bottom and a length. The length may extend along a side of the vehicle. A rocker flange may extend downward from the bottom. A rock slider may be attachable to the rocker panel along the length such that an edge of the rock slider extends below the rocker flange.

The vehicle may further include a cover. The cover may be removably attachable onto the rock slider. The cover may be shaped and sized to conceal the rock slider when the rock slider is not in use. The rock slider may have a body and one or more legs extending from the body. Each end of the one or more legs may be attachable to the rocker panel. The body of the rock slider may be tubular. The rock slider may be attachable to the rocker panel with one or more fasteners. The one or more fasteners may allow the rock slider to be removed, replaced, and serviced with ease. The rock slider may be configured to be used as a step for entering and exiting the vehicle. The rock slider may be further configured to be used as a recovery point.

In accordance with an embodiment of the present disclosure, there may be an apparatus for improving crash performance and preventing damage to body panels of a vehicle. The apparatus may include a rock slider attachable to a rocker panel of the vehicle along a length of the rocker panel such that an edge of the rock slider extends below a rocker flange extending downward from a bottom of the rocker panel. The apparatus may further include a cover. The cover may be removably attachable onto the rock slider. The cover may be shaped and sized to conceal the rock slider when the rock slider is not in use. The cover may be removably attachable onto the rock slider by one or more snap-on clips. The rock slider may have a body and one or more legs extending from the body. Each end of the one or more legs may be attachable to the rocker panel. The body of the rock slider may be tubular. The rock slider may be attachable to the rocker panel with one or more fasteners. The one or more fasteners may allow the rock slider to be removed, replaced, and serviced with ease. The rock slider may be configured to be used as a step for entering and exiting the vehicle. The rock slider may be further configured to be used as a recovery point.

In accordance with an embodiment of the present disclosure, there may be a method of using an apparatus for improving crash performance and preventing damage to body panels of a vehicle. The method may include attaching a rock slider to a rock panel of the vehicle along a length of the rocker panel such that an edge of the rock slider extends below a rocker flange extending downward from a bottom of the rocker panel. The method may further include attaching a cover onto the rock slider. The cover may be shaped and sized to conceal the rock slider when the rock slider is not in use. The method may include detaching the cover from the rock slider before the rock slider is to be used. The cover may be attached onto the rock slider with one or more snap-on clips. The rock slider may have a body and one or more legs extending from the body. The rock slider may be attached to the rocker panel from each end of the one or more legs. The body of the rock slider may be tubular. The rock slider may be configured to be used as a step for entering and exiting the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The apparatus and methods described herein enable users (e.g., drivers and/or passengers (interchangeable when referring to autonomous or semi-autonomous vehicles)) to protect their vehicles from damage when off-roading or driving over rough terrain and restore the visual appearance of their vehicles when driving on paved roads, freeways, designated roads, etc. Further, the apparatus and methods improve the rigidity and crash performance of the vehicle against frontal, rear, and side impacts.

A rock slider integrated into a vehicle may eliminate the difficult installation process, reduce the bulkiness, and improve rigidity as well as the crash performance of the vehicle against frontal, rear, and side impacts. A rock slider may be coupled to a vehicle and span a length of the rocker panel. The rock slider may be contained within the styling envelop of the vehicle. The rock slider may be mounted below a rocker flange of the vehicle to advantageously prevent damage to the rocker flange. When not off-roading or driving on rough terrain, a cover may be attached over the rock slider to advantageously maintain the style and overall appearance of the vehicle and hide the rock slider.

Figure 1A:
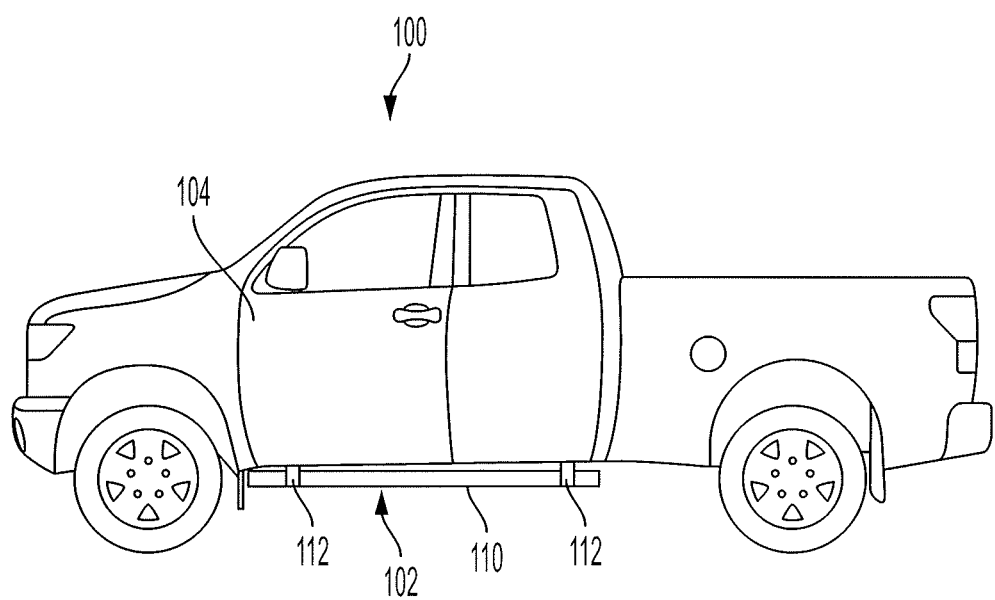
FIG. 1A illustrates a side view of a vehicle having a rock slider according to an aspect of the present disclosure.

FIG. 1A illustrates a side view of a vehicle 100 having a rock slider 102 according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van, or other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1A depicts a pick-up truck by example. The vehicle 100 may be an autonomous or semi-autonomous vehicle having self-driving capabilities. The vehicle 100 may have doors 104 to enter and exit out of the vehicle 100.

The rock slider 102 may extend along a rocker panel 106 (see FIG. 2) of the vehicle 100. In some embodiments, the rock slider 102 may extend along a portion of the rocker panel 106. The rock slider 102 may be attached to the rocker panel 106. In some embodiments, the rock slider 102 may be welded onto the rocker panel 106. In some embodiments, the rock slider 102 may be fastened onto the rocker panel 106 with bolts, screws, nuts, or other conventional fasteners. In such embodiments, holes 108 (see FIG. 2) may be drilled in the rocker panel 106.

The rock slider 102 may be built with hot rolled electric resistance welded (HREW) or drawn over mandrel (DOM) steel tubing. SAE 1020 mild carbon steel may be used to make the rock slider 102. In some embodiments, aluminum may be used instead. Other suitable materials and manufacturing processes conventionally used in rock slider making are also contemplated. The rock slider 102 may have a tubular body or be a tube 110. The tube 110 may have a hollow cavity or interior. The hollow interior may advantageously provide a relatively lighter rock slider 102. The tube 110 may have a round cross-section. The round cross-section may advantageously provide a uniform and sturdy structure without sharp edges that are prone to damage more easily. In some embodiments, the cross section of the tube 110 may be oval, square, rectangle, triangle, or any other shape.

The rock slider 102 may have one or more attachment points or legs 112 that attach the rock slider 102 to the vehicle. The legs 112 may be the same material as the tube 110. In some embodiments, the legs 112 may be plastic or a metal other than the material of the tube 110. The legs 112 may be welded or fastened onto the tube 110. For example, the legs 112 may have openings 114 (see FIG. 3B) being shaped and sized to provide a snug fitment over the tube 110.

The rock slider 102 may protect the vehicle 100 against rocks, logs, and/or the like that may otherwise cause damage to the vehicle 100. The rock slider 102 may serve as an attachment point for recovery and stability. The rock slider 102 may be used as a step if it has a width that can accommodate a foot or feet of a person that can use the rock slider 102 as leverage.

Figure 1B:
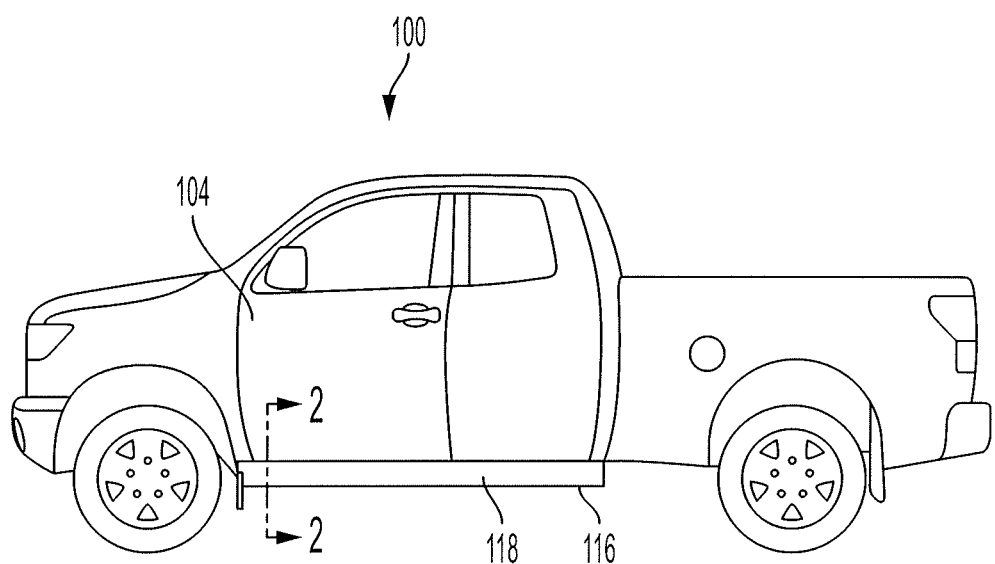
FIG. 1B illustrates a side view of the vehicle of FIG. 1A having a cover over the rock slider according to an aspect of the present disclosure.

FIG. 1B illustrates a side view of the vehicle 100 having a cover 116 over the rock slider 102 (see FIG. 1A) according to an aspect of the present disclosure. The cover 116 may be a vanity cover to conceal the rock slider 102 and preserve the overall appearance of the vehicle 100. The cover 116 may cover an entirety or a portion of the rock slider 102. In FIG. 1B, the entirety of the rock slider 102 is concealed. When attached, the cover 116 may sit directly under the doors 104 (only one shown). The cover 116 may be made from the same material as the doors 104. In other examples, the cover 116 may be made from plastic, metal, carbon fiber, or wood. Outer surface 118 of the cover 116 may be coated with paint. For example, the outer surface 118 may be coated with the same color as the vehicle 100 to achieve a homogenized and seamless appearance.

Figure 2:
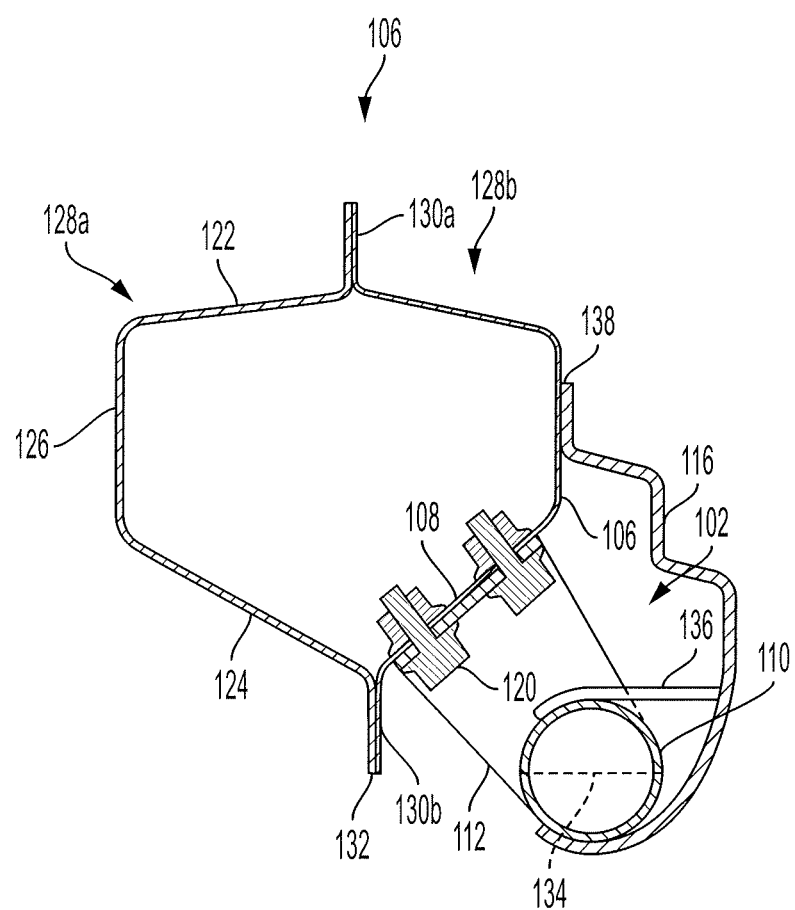
FIG. 2 illustrates a cross-section view of a rocker panel of the vehicle of FIG. 1A and the rock slider and the cover of FIG. 1B according to an aspect of the present disclosure.

FIG. 2 illustrates a cross-section view of the rocker panel 106, the rock slider 102, and the cover 116 according to an aspect of the present disclosure. The rock slider 102 may be attached to the rocker panel 106. The attachment may be facilitated via welding or fasteners, such as the bolts 120 mating with the holes 108 shown in FIG. 2. The attachment may be at a top surface 122, bottom surface 124, or a side surface 126 of the rocker panel 106. FIG. 2 shows the attachment at the bottom surface 124 by example. The top surface 122, bottom surface 124, and/or the side surface 126 may be horizontally or vertically straight or sloped. FIG. 2 shows a tapered bottom surface 124 by example.

The rocker panel 106 may have a left panel member 128a and a right panel member 128b. The left and right panel members 128a,b may be made separately and pieced together to make the rocker panel 106. The left and right panel members 128a,b may be coupled together by a rocker flange 130. As shown in FIG. 2, the rocker panel 106 may have an upper rocker flange 130a and a lower rocker flange 130b. In some embodiments, the rocker panel 106 may have a unitarily constructed body. The rock slider 102 may extend below the lower rocker flange 130b. The legs 112 of the rock slider 102 may extend from the rocker panel 106 such that at least the tube 110 may be positioned below a bottom end 132 of the lower rocker flange 130b. The legs 112 may also extend at least partially below the bottom end 132. The rocker flange 130 may be prone to damage from rocks and other debris on and off the road, and having the rock slider 102 below the lower rocker flange 130b may protect it from damage.

The tube 110 may be hollow as shown in FIG. 2 or solid. The tube 110 may have a diameter or width 134 between 0.5 inches (in) to 4 in. Preferably, the tube 110 may have a diameter or width 134 between 2 in to 4 in. The cover 116 may be partially or completely attached to the tube 110. In some embodiments, the cover 116 may be partially or completely attached to the rocker panel 106. In some embodiments, the cover 116 may be both attached to the tube 110 and the rocker panel 106. The cover 116 may be snapped onto the tube 110 with clips 136 as shown in FIG. 2. The cover 116 may conform to the shape of the tube 110 to provide further structural support and engagement. For example, the cover 116 shown in FIG. 2 curves under the tube 110 to support the tube 110. In some embodiments, the cover 116 may be slid over the tube 110. In some embodiments, the cover 116 may be hooked onto the tube 110. In some embodiments, the cover 116 may be attached to the tube 110 with conventional fasteners.

The cover 116 may be shaped and sized to conceal the tube 110 and the legs 112 of the rock slider 102. The cover 116 may have bumps, creases, grooves, lines, and/or the like. An upper end 138 of the cover 116 may bias the rocker panel 106. For example, the upper end 138 may bias the side surface 126 as shown in FIG. 2. In some embodiments, the upper end 138 may be affixed to the rocker panel 106. For example, conventional fasteners may be used to affix the upper end 138 to the rocker panel 106.

Figure 3A:
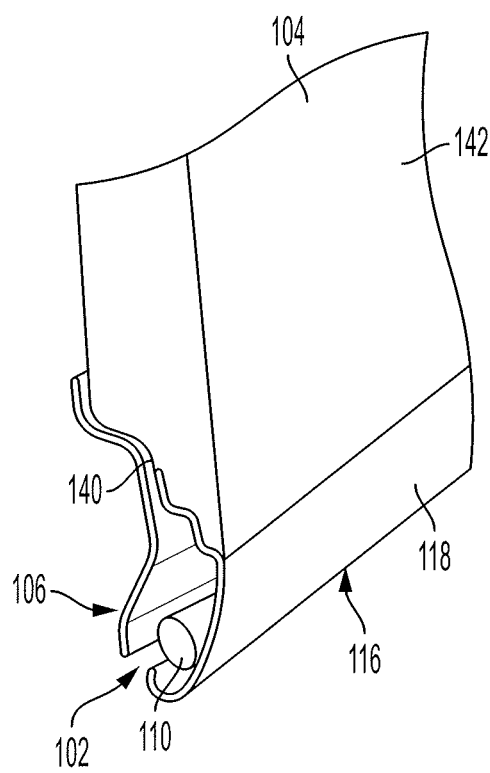
FIG. 3A illustrates a perspective view of a door of the vehicle, the rock slider, and the cover of FIG. 1B according to an aspect of the present disclosure.

FIG. 3A illustrates a perspective view of a door 104 of the vehicle 100 (see FIG. 1A), the rock slider 102, and the cover 116 according to an aspect of the present disclosure. The cover 116 may be shaped and sized to accommodate at least a portion of a bottom 140 of the door 104. The outer surface 118 of the cover 116 may be shaped so that the bottom 140 of the door 104 sits flush on the cover 116 when closed. In some embodiments, the cover 116 may be recessed relative to an outer surface 142 of the door 104. In some embodiments, the cover 116 may extend over the outer surface 142 of the door 104. The rock slider 102 may also be shaped and sized to accommodate at least a portion of the bottom 140 of the door 104. The cover 116 may be longer in length than the rocker panel 106 and the tube 110 in order to conceal both. In some embodiments, the cover 116 may be only longer than the tube 110 to cover the rock slider 102. When the door 104 is closed the outer surface 118 of the cover 116 and the outer surface 142 of the door 104 may be flush. The door 104 and the cover 116 may have a cohesive appearance when the door 104 is closed. In some embodiments, the cover 116 may extend out further than the outer surface 142. In such embodiments, the tube 110 may stick out further such that the rock slider 102 extends out further than the outer surface 142 as well.

Figure 3B:
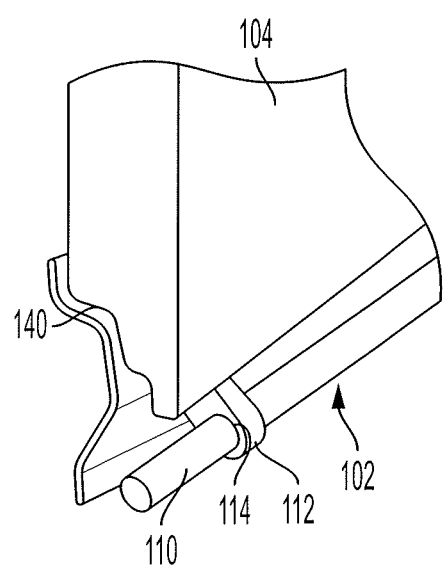
FIG. 3B illustrates a perspective view of the door and the rock slider without the cover of FIG. 1B according to an aspect of the present disclosure.

FIG. 3B illustrates a perspective view of the door 104 and the rock slider 102 without the cover 116 (see FIG. 3A) according to an aspect of the present disclosure. The door 104 is shown in the closed position, the bottom 140 of the door 104 resting flush against the rocker panel 106. A portion of the bottom 140 may hang from the rocker panel 106 as shown in FIG. 3B. The cover 116 may be removed by snapping off or sliding off the clips 136 (see FIG. 2) and/or disengaging any fasteners used in placing the cover 116 over the rock slider 102. The legs 112 of the rock slider 102 are shown engaged to and slid over the tube 110 as an example.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle having an improved crash performance and body panel damage protection comprising:
  a rocker panel having a bottom and a length, the length extending along a side of the vehicle, a rocker flange extending downward from the bottom;
  a rock slider attachable to the rocker panel along the length such that an edge of the rock slider extends below the rocker flange; and
  a cover removably attachable onto the rock slider and configured to be detached from the rock slider before the rock slider is to be used.

2. The vehicle of claim 1, wherein the cover is shaped and sized to conceal the rock slider when the rock slider is not in use.

3. The vehicle of claim 2, wherein the cover is removably attachable onto the rock slider by one or more snap-on clips.

4. The vehicle of claim 1, wherein the rock slider has a body and one or more legs extending from the body, each end of the one or more legs being attachable to the rocker panel.

5. The vehicle of claim 4, wherein the body of the rock slider is tubular.

6. The vehicle of claim 1, wherein the rock slider is configured to be used as a step for entering and exiting the vehicle.

7. The vehicle of claim 1, wherein the rock slider is configured to be used as a recovery point.

8. An apparatus for improving crash performance and preventing damage to body panels of a vehicle comprising:
  a rock slider attachable to a rocker panel of the vehicle along a length of the rocker panel such that an edge of the rock slider extends below a rocker flange extending downward from a bottom of the rocker panel; and
  a cover removably attachable onto the rock slider and configured to be detached from the rock slider before the rock slider is to be used.

9. The apparatus of claim 8, wherein the cover is shaped and sized to conceal the rock slider when the rock slider is not in use.

10. The apparatus of claim 9, wherein the cover is removably attachable onto the rock slider by one or more snap-on clips.

11. The apparatus of claim 8, wherein the rock slider has a body and one or more legs extending from the body, each end of the one or more legs being attachable to the rocker panel.

12. The apparatus of claim 11, wherein the body of the rock slider is tubular.

13. The apparatus of claim 8, wherein the rock slider is configured to be used as a step for entering and exiting the vehicle.

14. The apparatus of claim 8, wherein the rock slider is configured to be used as a recovery point.

15. A method of using an apparatus for improving crash performance and preventing damage to body panels of a vehicle comprising:
  attaching a rock slider to a rocker panel of the vehicle along a length of the rocker panel such that an edge of the rock slider extends below a rocker flange extending downward from a bottom of the rocker panel;
  attaching a cover onto the rock slider, the cover shaped and sized to conceal the rock slider when the rock slider is not in use; and
  detaching the cover from the rock slider before the rock slider is to be used.

16. The method of claim 15, wherein the cover is attached onto the rock slider with one or more snap-on clips.

17. The method of claim 15, wherein the rock slider has a body and one or more legs extending from the body, the rock slider being attached to the rocker panel from each end of the one or more legs.

18. The method of claim 17, wherein the body of the rock slider is tubular.

19. The method of claim 15, wherein the rock slider is configured to be used as a step for entering and exiting the vehicle.

* * * * *